US012674253B2

(12) United States Patent　　　　(10) Patent No.:　US 12,674,253 B2
Stephan et al.　　　　　　　　　　　(45) Date of Patent:　　Jul. 7, 2026

(54) ELECTRONIC DEVICE FOR LOCATING A FUNCTIONAL DISORDER WITHIN A SPINNING AND WINDING SECTION OF A SPINNING MILL AND A METHOD FOR LOCATING THE SAME

(71) Applicant: Maschinenfabrik Rieter AG, Winterthur (CH)

(72) Inventors: Adalbert Stephan, Beilngries (DE); Gerard Küsters, Selfkant (DE); Nitin Patil, Winterthur (CH)

(73) Assignee: Maschinenfabrik Rieter AG, Winterthur (CH)

( * ) Notice: Subject to any disclaimer, the term of this patent is extended or adjusted under 35 U.S.C. 154(b) by 114 days.

(21) Appl. No.: 18/699,008

(22) PCT Filed: Sep. 5, 2022

(86) PCT No.: PCT/IB2022/058333
　　§ 371 (c)(1),
　　(2) Date: Apr. 5, 2024

(87) PCT Pub. No.: WO2023/057835
　　PCT Pub. Date: Apr. 13, 2023

(65) Prior Publication Data
　　US 2025/0236994 A1　　Jul. 24, 2025

(30) Foreign Application Priority Data
　　Oct. 8, 2021　(EP) ..................................... 21201596

(51) Int. Cl.
　　*D01H 13/32*　　　(2006.01)
　　*D01H 13/14*　　　(2006.01)
　　　　　　　(Continued)

(52) U.S. Cl.
　　CPC ............. *D01H 13/32* (2013.01); *D01H 13/14* (2013.01); *G05B 13/0285* (2013.01);
　　　　　　　(Continued)

(58) Field of Classification Search
　　CPC ........ D01H 13/32; D01H 13/14; D01H 13/16; D01H 13/20; D01H 13/22; D01H 13/26;
　　　　　　　(Continued)

(56) References Cited

U.S. PATENT DOCUMENTS 5,100,073 A　　3/1992　Moehrke et al.
5,182,900 A *　2/1993　Horak ..................... D01H 15/00
　　　　　　　　　　　　　　　　　57/22
　　　　　　　(Continued)

FOREIGN PATENT DOCUMENTS

DE　　10 2016 007779 A1　12/2017
EP　　　3 305 700 A1　　4/2018
　　　　　　　(Continued)

OTHER PUBLICATIONS

EPO Search Report, Mar. 7, 2022.
PCT Search Report and Written Opinion, Nov. 25, 2022.

*Primary Examiner* — Alissa J Tompkins
*Assistant Examiner* — Dakota Marin
(74) *Attorney, Agent, or Firm* — Dority & Manning, P.A.

(57)　　　　ABSTRACT

An electronic device for locates a functional disorder within a spinning and winding section of a spinning by receive spinning parameters from spinning machines related to production of yarn delivery bobbins at the spinning machines, and receiving winding parameters from winding machines related to production of yarn bobbins at the winding machines. For the yarn bobbins, the electronic device compares a winding parameter with a normal state level value for the winding parameter to detect a winding abnormality at the respective winding machine that pro- (Continued)

duced the yarn bobbin. Upon detection of the winding abnormality, the electronic device the yarn delivery bobbins used for production of the yarn bobbin and compares at least one of the spinning parameters of the identified yarn delivery bobbins with a normal state level value to locate the functional disorder within the spinning and winding section.

12 Claims, 3 Drawing Sheets

(51) Int. Cl.

| | |
|---|---|
| *G05B 13/02* | (2006.01) |
| *B65H 63/00* | (2006.01) |
| *B65H 63/02* | (2006.01) |
| *D01H 13/16* | (2006.01) |
| *D01H 13/20* | (2006.01) |
| *D01H 13/22* | (2006.01) |
| *D01H 13/26* | (2006.01) |

(52) U.S. Cl.
   CPC ............ *B65H 63/00* (2013.01); *B65H 63/006* (2013.01); *B65H 63/02* (2013.01); *D01H 13/16* (2013.01); *D01H 13/20* (2013.01); *D01H 13/22* (2013.01); *D01H 13/26* (2013.01)

(58) Field of Classification Search
   CPC .. G05B 13/0285; B65H 63/00; B65H 63/006; B65H 63/02
   USPC .......................................................... 57/264
   See application file for complete search history.

(56) References Cited

U.S. PATENT DOCUMENTS

| | | | | |
|---|---|---|---|---|
| 5,636,803 | A * | 6/1997 | Aschmann ........... | B65H 63/006 242/477.8 |
| 5,799,476 | A * | 9/1998 | Bahlmann .............. | D01H 13/22 57/263 |
| 6,340,129 | B1 * | 1/2002 | Haasen .................. | B65H 69/00 242/419.1 |
| 8,904,742 | B2 * | 12/2014 | Stephan ................... | D01H 4/48 57/263 |
| 9,353,463 | B2 * | 5/2016 | Stahlecker ............. | D01H 15/00 |
| 11,319,649 | B2 * | 5/2022 | Archontopoulos .... | D01H 13/22 |
| 11,673,761 | B2 * | 6/2023 | Maleck .................. | B65H 63/00 700/130 |
| 11,814,755 | B2 * | 11/2023 | Kousalik ............... | D01H 13/22 |
| 12,299,588 | B2 * | 5/2025 | von Grünigen et al. ..................... | D01G 31/006 |
| 2002/0124545 | A1 * | 9/2002 | Griesshammer ....... | D01H 5/005 57/317 |
| 2017/0146989 | A1 * | 5/2017 | Locatelli ............ | G05B 23/0283 |
| 2021/0148012 | A1 | 5/2021 | Archontopoulos et al. | |
| 2023/0323571 | A1 * | 10/2023 | Schmitt .................. | G05B 15/02 57/265 |

FOREIGN PATENT DOCUMENTS

| | | | | |
|---|---|---|---|---|
| WO | WO 2012/051730 | | 4/2012 | |
| WO | WO-2012051730 A1 * | 4/2012 | ......... G01N 21/8915 |

* cited by examiner

ELECTRONIC DEVICE FOR LOCATING A FUNCTIONAL DISORDER WITHIN A SPINNING AND WINDING SECTION OF A SPINNING MILL AND A METHOD FOR LOCATING THE SAME

FIELD OF THE INVENTION

The present disclosure relates to an electronic device for locating a functional disorder within a spinning and winding section of a spinning mill and to a method for locating a functional disorder within a spinning and winding section of a spinning mill.

BACKGROUND OF THE INVENTION

Spinning mills include various sections comprising different types of textile machines for converting natural and man-made fibers and their blends into yarns. Spinning mills are designed to produce yarns in a form enabling a proper yarn performance in subsequent manufacturing steps. For this purpose, it is required that the yarn matches predefined quality parameters, and that the yarn is produced in a configuration which is adapted for subsequent manufacturing steps. Quality parameters of yarns may relate to mass, thickness, number of filaments, etc. Configurations of yarns produced by the spinning mill may relate to yarn bobbins, on which a large amount of yarn is wound up for efficient transportation and use.

A spinning and winding section of a spinning mill may include one or more spinning machines and one or more winding machines.

A spinning machine includes a plurality of spinning positions. At the spinning positions, roving bobbins are received from upstream textile machines. At the spinning positions, roving is unwound from the roving bobbins, stretched, twisted (spun) and wound as yarn onto a tube forming a yarn delivery bobbin. During the production of the yarn delivery bobbins, yarn parameters can be monitored.

The winding machines are arranged downstream from the spinning machines and receive the yarn delivery bobbins produced by the spinning machines.

A winding machine includes a plurality of winding positions. At the winding positions, yarn delivery bobbins which were produced by upstream spinning machines are rewound one after the other onto a cross-wound bobbin. The purpose of rewinding is to produce large yarn bobbins that can be transported and used efficiently. During the rewinding, properties of the yarn can be monitored and compared with predefined quality criteria. If a quality criterion is not met, the defective part of the yarn can be removed. So-called yarn clearing systems are known for this purpose, see e.g., WO2012051730, which enable respective clearing operations.

The yarn bobbins are produced by the winding machines in a configuration which is adapted for subsequent manufacturing steps.

EP3305700 discloses yarn winding system which includes an automatic winder configured to wind yarn from a yarn supply bobbin to form a package, and a roving frame and a spinning frame each configured to perform a spinning process at a previous step for the automatic winder. The automatic winder includes a yarn monitoring unit configured to detect a state of the yarn travelling and a transmission unit configured to transmit information on a monitoring result of the yarn monitoring unit to the roving frame and the spinning frame. The roving frame and the spinning frame include a receiving unit, configured to receive the information on the monitoring result of the yarn monitoring unit from the automatic winder. The spinning frame winds yarn to form a yarn supply bobbin. The automatic winder winds the yarn from the yarn supply bobbin to form a package. A bobbin transfer device transfers the yarn supply bobbin from the spinning frame to the automatic winder and transfers an empty bobbin from the automatic winder to the spinning frame using respective trays which include an RF (RF: radio frequency) tag for storing information on the yarn supply bobbin. The bobbin transfer device includes an RF writer for writing information on the RF tag which includes unit identification information for identifying a spinning unit that has formed the yarn supply bobbin and doffing information for identifying timing of doffing. The automatic winder includes an RF reader for reading information written on the RF tag for identifying the spinning unit that has formed the yarn supply bobbin and the timing of doffing.

US2021148012A1 discloses a ring spinning systems which contains a ring spinning machine having a plurality of spinning positions and a winding machine having a plurality of winding positions. Yarn is spun at one of the spinning positions and wound up to a cop. Values of a spinning parameter are determined at different times during the winding of the cop and stored as spinning data. The cop is transported from the spinning position to one of the winding positions. At the winding position the yarn is rewound from the cop onto a yarn bobbin. Values of a yarn parameter are determined at different times during the rewinding of the cop and stored as yarn data. The spinning data and the yarn data are automatically assigned to each other in such a way that they relate to the same yarn section. Based on the spinning data and yarn data assigned to each other, an intervention is made on the ring spinning machine.

U.S. Pat. No. 5,100,073A discloses an automatic textile winder. An origination indicia is associated with each spinning tube supplied to the winder, e.g., in the form of a label, marking, or the like. A quality-control device is provided at each winding station to monitor a quality-related parameter of the yarn winding operation. Another device is provided at each winding station in operative association with the respective quality control device for cancelling the indicia of each spinning tube whose yarn satisfies a predetermined value for the quality-related parameter as determined by the quality-control device, but leaving uncancelled the indicia of any spinning tube whose yarn fails to satisfy such quality value. Each spinning tube discharged from the winding stations is delivered to a detection station for reading or otherwise detecting any indicia remaining thereon. In this manner, the origin of inferior or sub-quality yarn can be readily identified.

DE102016007779A1 relates to monitoring the correct operation of spinning positions of a ring spinning machine. A device identifies the spinning cops and allows a spinning cop to be assigned at any time to the spinning position that produced the spinning cop. Sensor devices arranged on the winding positions of a downstream automatic winder monitor the yarn of the spinning cop during a subsequent rewinding process. According to the invention, the running yarn of the spinning cop is scanned by a sensor device, which is designed as a yarn tension sensor and the yarn tension data are sent to the winding unit computer for determining yarn tension data which are above a predeterminable limit value and thus indicates a hard-wound spinning cop which is interpreted as problematic. The yarn tension data are then assigned to the spinning unit of the ring spinning machine who has manufactured the spinning cop in question.

BRIEF SUMMARY OF THE INVENTION

Objects and advantages of the invention will be set forth in part in the following description, or may be obvious from the description, or may be learned through practice of the invention.

There may be a need for an electronic device for locating a functional disorder within a spinning and winding section of a spinning mill and for a method for locating a functional disorder at a spinning and winding section of a spinning mill. There may be a need for an electronic device for locating a functional disorder at a spinning machine or at a winding machine or at transportation of yarn delivery bobbins from spinning machines to winding machines within a spinning and winding section of a spinning mill. There may be a need for an electronic device for locating a functional disorder at a spinning machine or at a winding machine or at transportation of yarn delivery bobbins from spinning machines to winding machines within a spinning and winding section of a spinning mill which enable locating the functional disorder quickly, and which provide more flexibility for locating the functional disorder.

These needs may be met by the subject-matter of the invention disclosed and claimed herein.

An aspect of the invention relates to an electronic device for locating a functional disorder within a spinning and winding section of a spinning mill, the spinning and winding section including one or more spinning machines and one or more winding machines, the one or more spinning machines being configured to produce a plurality of yarn delivery bobbins with wound yarn, the one or more winding machines being configured to receive yarn delivery bobbins with wound yarn produced by the one or more spinning machines for producing yarn bobbins, the electronic device being configured to: receive from the one or more spinning machines spinning parameters of produced yarn delivery bobbins; receive from the one or more winding machines winding parameters related to the production of yarn bobbins; compare at least one of the winding parameters with a level which defines a normal state of the at least one of the winding parameters for detecting a winding abnormality; in case of a winding abnormality, determine and compare at least one of the spinning parameters of yarn delivery bobbins received in the one or more winding machines with a level which defines a normal state of the at least one spinning parameters for locating the functional disorder within the spinning and winding section. Based on a winding abnormality detected at a winding machine, a functional disorder can be located within the spinning and winding section including spinning machines and winding machines. The spinning parameters and winding parameters can be received via respective signal lines, such as via wired or wireless computer networks. For example, a number of winding errors exceeding a predefining limit may indicate an functional disorder within the spinning and winding section. The location of the functional disorder is determined by comparing spinning parameters with a level which defines a normal state. For example, in case of an excessive number of winding errors, the spinning parameters can be used to determine whether the functional disorder is located at the winding machine or at a spinning machine or transportation of yarn delivery bobbins. For example, winding parameters may indicate no other abnormality beside the excessive number of winding errors, while spinning parameters indicate that the abnormality of an excessive number of winding errors occurs when yarn delivery bobbins are received in the winding machine which were produced at a particular spinning position, wherein a spinning parameter such as a rotating speed at that spinning position may be at an abnormal level, thereby locating that spinning position as the functional disorder within the spinning and winding section. This simple example may not be construed as limiting the scope of the claims, because the person skilled in the art readily can define various scenarios for locating the functional disorder within the spinning and winding section based on respective received spinning parameters and winding parameters.

Yarn delivery bobbins typically have wound spun yarn on a suitable carrier, such as wound on a tube. A tube can be adapted for carrying a relatively small amount of yarn. A yarn delivery bobbin having a relatively limited amount of yarn wound on a tube as a carrier may be designated as cop. However according to one aspect of the invention—which can also be considered to be an independent inventive concept—yarn delivery bobbins may also relate to relatively large cross-wound bobbins produced by e.g. rotor spinning machines or airjet spinning machines, wherein when received in the winding machine the spun yarn of a single cross-wound bobbin is rewound onto a respective (cross-wound) yarn bobbin. This may for example be done for improving the quality of the yarn by making use, for example, of a yarn cleaning device, a splice device, etc. of the winding machine, thereby enabling different applications so, for example, for subsequent dyeing of the yarn or for use on special weaving machines that require rapid removal of the yarn from the cross-wound package. Such rewinding may also be necessary to obtain bobbins with particularly high quality yarn.

In some embodiments, the functional disorder is located at a spinning machine or at a winding machine or at transportation of yarn delivery bobbins from spinning machines to winding machines. The functional disorder can be located either at a spinning machine or at a winding machine or at transportation, or the functional disorder can be located at a combination of a spinning machine and a winding machine and transportation.

In some embodiments, spinning parameters of yarn delivery bobbins received in the one or more winding machines are determined based on yarn delivery bobbin identifiers of yarn delivery bobbins. During production of yarn delivery bobbins, spinning parameters are stored assigned to yarn delivery bobbin identifiers. When yarn delivery bobbins are received in the winding machines, spinning parameters are determined based on yarn delivery bobbin identifiers.

In some embodiments, the functional disorder is located at a winding machine or at transportation of yarn delivery bobbins from spinning machines to winding machines if the spinning parameters have a normal state, and at a spinning machine otherwise. After detecting an abnormality at a winding machine, the functional disorder can be located by evaluating the spinning parameters. For example, the spinning parameters may relate to spinning positions which have a particular rotation speed. If this particular rotation speed has a normal level, the functional disorder within the spinning and winding section can be located at the winding machine. Otherwise, the functional disorder can be located at a spinning machine with spinning positions which have the particular rotation speed.

In some embodiments, spinning parameters relate to an imperfection index, a hairiness, a variation coefficient of yarn mass, a variation index of yarn diameter, a number of thick places per unit of length, a number of thin places per unit of length, a number of periodic yarn faults per unit of length, a number of yarn count variants per unit of length, and/or a number of foreign materials per unit of length. Spinning parameters which are widely available in spinning and winding sections can be used for locating a functional disorder.

In some embodiments, the spinning parameters relate to one or more of a doffing time, a spindle speed, a ring traveler speed, a number of yarn breaks per unit of time, an air temperature, and an air humidity. Spinning parameters which are widely available in spinning and winding sections can be used for locating a functional disorder.

In some embodiments, the winding parameters relate to one or more of a yarn tension, a number of clearing operations, a consumption of energy, a number of produced yarn bobbins per unit of time, an imperfection index, and a hairiness. Winding parameters which are widely available in spinning and winding sections can be used for locating a functional disorder.

In some embodiments, the electronic device is further configured to receive spinning parameters and/or winding parameters by accessing a controller of a spinning machine and/or a controller of a winding machine. The electronic device can be easily adapted to existing spinning and winding sections.

In some embodiments locating the functional disorder is based on one or more of a neural network algorithm and a fuzzy logic algorithm. Powerful tools can be used for locating a functional disorder in a spinning and winding section.

In some embodiments, the electronic device is further configured to signal the location of the functional disorder to one or more of the spinning machines, the winding machines, an automatic repair system and a computer display. The electronic device can support automatic-, semi-automatic or manual correction of a functional disorder within a spinning and winding section. Signaling the location to a spinning machine and/or a winding machine, such as a respective controller, can support automatic correction, for example by activation of a respective robot. Signaling the location of a functional disorder to a computer display can support semi-automatic or manual correction.

In some embodiments, the electronic device further includes a signal line interface which is configured for receiving spinning parameters from the one or more spinning machines and for receiving winding parameters from the one or more winding parameters via a signal line. The electronic device can be arranged distinct from respectively remote from the spinning machines and the winding machines.

The invention is also directed to a computer system which is configured for putting into practice an method as defined below, the computer system comprising one or more computers, the one or more computers preferably comprising a graphical user interface. The computers can relate to machine controllers, desktop computers, notebook computers, tablet computers, smartphones, etc. The graphical user interface can relate to a display, a touchscreen, a display with keyboard and mouse, etc. The computer system can include existing controllers of spinning machines and winding machines, existing controllers and/or computers of a spinning mill, etc.

The invention also relates to a method for locating a functional disorder within a spinning and winding section of a spinning mill, the spinning and winding section including one or more spinning machines and one or more winding machines, the one or more spinning machines being configured to produce a plurality of yarn delivery bobbins with wound yarn, the one or more winding machines being configured to receive yarn delivery bobbins with wound yarn produced by the one or more spinning machines for producing yarn bobbins, wherein the method includes the steps executed by an electronic device or a computer system of: receiving from the one or more spinning machines spinning parameters of produced yarn delivery bobbins; receiving from the one or more winding machines winding parameters related to the production of yarn bobbins; comparing at least one of the winding parameters with a level which defines a normal state of the at least one of the winding parameters for detecting a winding abnormality; in case of a winding abnormality, determining and comparing at least one of the spinning parameters of yarn delivery bobbins received in the one or more winding machines with a level which defines a normal state of the at least one spinning parameters for locating the functional disorder within the spinning and winding section.

In some embodiments, the functional disorder is located at a spinning machine or at a winding machine or at transportation of yarn delivery bobbins from spinning machines to winding machines.

In some embodiments, the functional disorder is located at a winding machine or at transportation of yarn delivery bobbins from spinning machines to winding machines if the spinning parameters have a normal state, and at a spinning machine otherwise.

In some embodiments, locating the function disorder is based on one or more of a neural network algorithm and a fuzzy logic algorithm.

In some embodiments, the method further includes signaling the location of the functional disorder to one or more of the spinning machines, the winding machines, an automatic repair system and a computer display.

BRIEF DESCRIPTION OF DRAWINGS

The invention will be better understood with the aid of the description of an embodiment given by way of example an illustrated by the figures, in which.

DETAILED DESCRIPTION OF THE INVENTION

Figure 1:
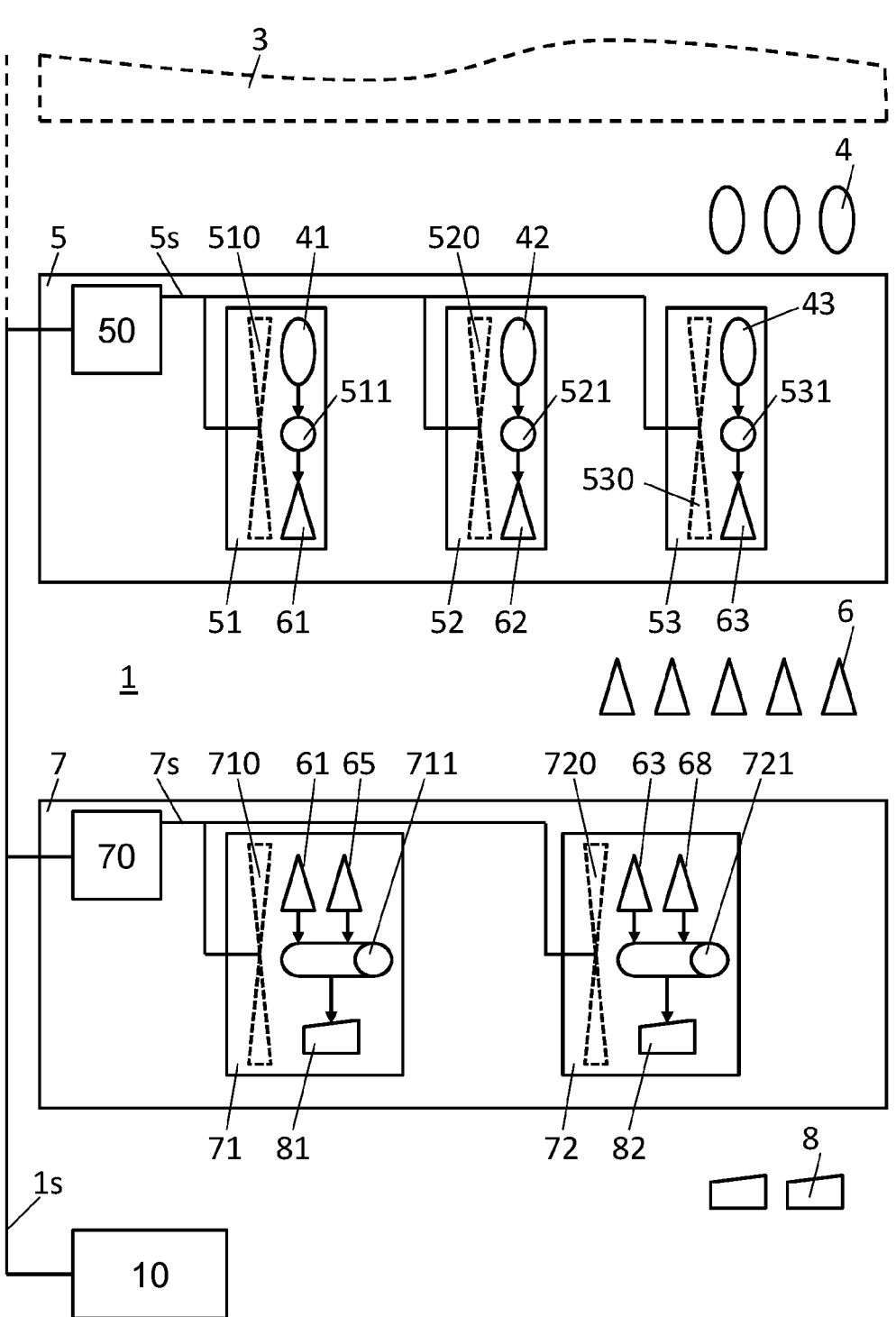
FIG. 1 illustrates schematically an electronic device for locating a functional disorder within an exemplary spinning and winding section of a spinning mill having arranged a spinning machine and a winding machine.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

The foregoing summary, as well as the following detailed description of the preferred embodiments, is better understood when read in conjunction with the appended drawings.

For the purposes of illustrating the invention, an embodiment that is presently preferred, in which like numerals represent similar parts throughout the several views of the drawings, it being understood, however, that the invention is not limited to the specific methods and instrumentalities disclosed.

FIG. 1 illustrates schematically an electronic device 10 for locating a functional disorder within an exemplary spinning and winding section 1 of a spinning mill having an arranged spinning machine 5 and a winding machine 7. In typical spinning mills, the spinning and winding section 1 includes a plurality of spinning machines and a plurality of winding machines (not illustrated in FIG. 1).

As illustrated in FIG. 1, the spinning machine 5 is arranged upstream from the winding machine 7. Correspondingly, the winding machine 7 is arranged downstream from the spinning machine 5. In spinning and winding sections of typical spinning mills, a plurality of spinning machines and a plurality of winding machines are arranged respectively.

The spinning machine 5 may relate to a ring spinning machine. However, within the context of the present application, the spinning machine 5 can also relate to another type of spinning machine producing yarn sections with typically a relatively limited length, which are then to be rewound by a winding machine to form bobbins comprising yarn of sufficient length. For example, the spinning machine 5 may also be a rotor spinning machine. However, as has also been described herein, according to a variation of the invention, a spinning machine may also be a rotor spinning machine or airjet spinning machine.

The spinning machine 5 receives roving 4, which was produced by an upstream roving machine 3 (typically, a plurality of roving machines is arranged), and produces yarn delivery bobbins 6 (carriers) with wound yarn. The spinning machine 5 includes a plurality of spinning positions 51, 52, 53. At each spinning position 51, 52, 53, roving 41, 42, 43 is received. For example, roving 41, 42, 43 may be arranged on bobbins or another type of carrier, such as in containers of specific dimensions. Each spinning position 51, 52, 53 includes a spinning unit 511, 521, 531. Each spinning unit 511, 521, 531 can include a drafting device and a twisting device, wherein the drafting device is configured to draft the roving and the twisting device is configured to spin the drafted roving into spun yarn and to wind the spun yarn on a yarn delivery bobbin. At each spinning position 51, 52, 53, yarn delivery bobbins 61, 62, 63 are produced which each have wound up a specific amount of spun yarn. Typically, at specific times, the yarn delivery bobbins 61, 62, 63 are doffed from the spinning positions 51, 52, 53 for subsequent processing.

The winding machine 7 receives yarn delivery bobbins 6, which were produced by the upstream spinning machine 5 (typically, a plurality of upstream spinning machines is arranged), and produces yarn bobbins 8. The winding machine 7 includes a plurality of winding positions 71, 72. At each winding position 71, 72, yarn delivery bobbins 61, 65, 63, 68 are received. Each winding position includes a winding unit 711, 721. Each winding unit 711, 721 may include a winding device, a tension applying device, a yarn monitoring device, an upper yarn catching device, a lower yarn catching device, a splicing device, a clearing system for removing yarn not matching a predefined quality criterion, etc. At each winding position 71, 72, one or more yarn delivery bobbins 61, 65, 63, 69 can be received. In the example illustrated in FIG. 1, at each winding position 71, 72 two yarn delivery bobbins 61, 65, 63, 68 are received.

However, more or less yarn delivery bobbins can be received at winding positions of a winding machine. At each winding position 71, 72, yarn is unwound from yarn delivery bobbins 61, 65, 63, 68 and wound on yarn bobbins 81, 82. At specific times, the yarn bobbins are unloaded from the winding positions 71, 72 for subsequent manufacturing steps.

Typically, the number of spinning positions 51, 52, 53 of a spinning machine 5 and the number of winding positions 71, 72 of a winding machine 7 is large and strongly exceeds the small number of positions schematically illustrated in FIG. 1.

As illustrated in FIG. 1, the spinning machine 5 includes a spinning controller 50 for controlling operation of the spinning machine 5. The spinning controller 50 is connected via signal line 5s with control units 510, 520, 530 of the spinning units 511, 521, 531 arranged at the spinning positions 51, 52, 53. The control units 510, 520, 530 receive from the spinning controller 50 control signals via the signal line 5s for controlling operation of the spinning units 511, 521, 531 for producing yarn delivery bobbins 61, 62, 63 of a desired specification from roving 41, 42, 43. The desired specification of the yarn delivery bobbins 61, 62, 63 may relate to a quality of yarn, a quantity of yarn, a number of produced yarn delivery bobbins 61, 62, 63 per unit of time, etc. Control signals enable adjusting operational parameters of the spinning units 511, 512, 513, such as a spindle speed, drafting rate, a mode of movement of a ring bench and/or of a spindle bench, a rotation speed of a spinning pot, a rotation speed of a driven spinning ring, a rotation speed of a controlled rotating spinning ring, a ring traveler speed, etc. Control signals can also be used to control an auxiliary module of a spinning machine. For example, an auxiliary module may be a spindle monitor of a spinning machine or a service robot of a spinning machine. For example, by means of a control signal, a service robot can be instructed to drive to a specific spinning position and carry out a more detailed analysis of the spinning position and/or carry out certain maintenance actions (e.g. replace a ring traveler or clean the rollers of a drafting system). The control units 510, 520, 530 transmit monitor signals to the spinning controller 50 via the signal line 5s. Monitor signals may relate to the spinning units 511, 521, 531, (e.g. signals related to spindle speed, ring traveler speed, drafting rate, etc.), to the roving 41, 42, 43, (e.g. signals related to the presence and/or amount of roving at a specific spinning position (e.g. spindle position of a ring spinning machine), identifier of a roving carrier, etc.), to the yarn spun in the spinning units 511, 521, 531, (e.g. signals related to yarn imperfection index, hairiness, etc.), to the yarn delivery bobbins 61, 62, 63, (e.g. a yarn delivery bobbin identifier, etc.), etc. Monitor signals may be based on or derived from signals generated by respective sensors. Monitor signals may relate to a yarn delivery bobbin identifier (cf. further description below), an imperfection index, a hairiness, a spinning position, a doffing time (time remaining until next doffing), a spindle speed, a number of yarn breaks per unit of time, a ring traveler speed, a rotation speed of a spinning pot, a rotation speed of a driven spinning ring, a rotation speed of a controlled rotating spinning ring, a number of yarn breaks per unit of time, a number of yarn breaks per unit of yarn length, an air temperature, an air humidity, etc.

As illustrated in FIG. 1, the winding machine 7 includes a winding controller 70 for controlling operation of the winding machine 7. The winding controller 70 is connected via signal line 7s with control units 710, 720 of the winding units 711, 721 arranged at the winding positions 71, 72. The control units 710, 720 receive from the winding controller 70 control signals via the signal line 7s for controlling operation of the winding units 711, 721 for producing yarn bobbins 81, 82 of a desired specification from yarn delivery bobbins 61, 65, 63, 68. The desired specification of the yarn bobbins 81, 82 may relate to a quantity of yarn per yarn bobbin 81, 82, a number of produced yarn bobbins 81, 82 per unit of time, an amount of energy required for producing a yarn bobbin 81, 82, etc. Control signals enable adjusting operational parameters of the winding units 711, 721, 731, such as a winding speed, a number of active winding positions, a power of a vacuum system, a number of active yarn delivery bobbins (bobbin) preparation stations, etc. The control units 710, 720 transmit monitor signals to the winding controller 70 via the signal line 7s. Monitor signals may relate to the winding units 711, 721, to the yarn delivery bobbins 61, 65, 63, 68, to the yarn unwound from the yarn delivery bobbins 61, 65, 63, 68 and wound onto the yarn bobbins 81, 82, to the yarn bobbins 81, 82, etc. Monitor signals may be based or derived from signals generated by respective sensors, in particular of a yarn clearer or of multiple yarn clearers (e.g. different types of yarn clearers). Monitor signals may relate to yarn delivery bobbin identifiers of yarn delivery bobbins received in the winding units (cf. further description below), a yarn tension, a number of clearing operations performed by a clearing system, a consumption of energy, a number of produced yarn bobbins per unit of time, etc. Monitor signals provided by or derived from one yarn clearer or multiple yarn clearers may relate to yarn count, thick places, thin places, twist level, yarn strength, yarn elongation properties, tenacity, twist and count, yarn hairiness, yarn imperfection index, yarn color and others.

When a yarn delivery bobbin 6 is produced by the spinning machine 5, respective spinning parameters sp apply. The yarn delivery bobbin 6 is then transported to the winding machine 7 and then received in the winding machine 7. For the purpose of determining the spinning parameters sp of the yarn delivery bobbin 6 received in the winding machine 7, a yarn delivery bobbin 6 can include an identifier unit, such as an RFID tag (RFID: Radio Frequency Identifier), having stored a yarn delivery bobbin identifier in the form of a unique identification number, for example. At the spinning positions 51, 52, 53 of the spinning machine 5 and at the winding positions 71, 72 of the winding machine 7, reader units, such as an RFID reader, can be arranged for determining yarn delivery bobbin identifiers of yarn delivery bobbins 6 arranged at the spinning positions 51, 52, 53 respectively at the winding positions 71, 72 by reading the unique identification number from the identifier unit attached to the respective yarn delivery bobbin 6. Thus, the electronic device 10 can receive and store the spinning parameters sp of a yarn delivery bobbin 6 produced by the spinning machine 5 and its yarn delivery bobbin identifier. Furthermore, the electronic device 10 can determine spinning parameters of a yarn delivery bobbin 6 received in the winding machine 7 on the basis of its yarn delivery bobbin identifier.

Alternatively or additionally, a predetermined transport plan can apply for transporting yarn delivery bobbins 6 from the spinning machine 5 to the winding machine 7, for example when a rail system is arranged for transporting yarn delivery bobbins 6. The electronic device 10 can receive and store spinning parameters sp of produced yarn delivery bobbins 6 assigned to the transport plan. The electronic device 10 can determine spinning parameters sp of yarn delivery bobbins 6 received in the winding machine 7 based on the transport plan with assigned spinning parameters sp.

As indicated in FIG. 1 by respective reference numerals, the spinning machine 5 produces yarn delivery bobbins with reference numerals 61, 62, 63, while the winding machine 7 has received yarn delivery bobbins having different reference numerals 61, 65, 63, 68. The difference in the reference numerals illustrates that the yarn delivery bobbins received in the winding machine may relate to yarn delivery bobbins which were produced at various spinning positions of various upstream spinning machines.

As illustrated in FIG. 1, an electronic device 10 is arranged. The electronic device 10 includes a signal line interface (not illustrated) for connecting the electronic device 10 via signal line 1s to respective signal line interfaces (not illustrated) of the spinning controller 50 of the spinning machine 5 and of the winding controller 70 of the winding machine 7. Typically, the electronic device is connected to a plurality of spinning machines and to a plurality of winding machines. As indicated in FIG. 1, the electronic device 10 may be connected via signal line 1s to further upstream machines, such as the roving machine 3.

The electronic device 10, the spinning controller 50, the winding controller 70, the signal line interfaces (not illustrated), the signal lines 1s, 5s, 7s, etc. may relate to computerized devices, computerized network interfaces and computerized networks. The computerized networks may relate to wired computer networks, wireless computer networks, etc. The computerized network interfaces (not illustrated) may relate to wired computer network interfaces, wireless computer network interfaces, etc. The computerized network interfaces, computerized networks may enable protocols such as an Internet Protocol Suite, an IEEE 802 standard, an Ethernet technology, a wireless LAN (widely known as WLAN or WiFi), etc. The computerized networks and computerized network interfaces enable transmission of control signals, monitor signals, etc. between respective devices, controllers, units, etc. The computerized devices may relate to microcontrollers, computers, etc. The computerized devices may include one or more processors and program instructions stored in a memory, which program instructions, when executed by the one or more processors, provide the functions as described in the present disclosure. The devices, controllers, units, etc. may include user interfaces such as graphical user interfaces (GUI) for enabling displaying status information to an operator and/or for enabling receiving commands from an operator. For example, the electronic device 10 may relate to a control and monitoring device of a spinning mill.

The roving 4 and respectively the yarn delivery bobbins 6 may be transported automatically, semi-automatically or manually from the roving machine 3 to the spinning machine 5 (or a plurality of such machines) and respectively from the spinning machine 5 to the winding machine 7 (or a plurality of such machines). The yarn bobbins 8 may be transported away from the winding machine 7 automatically, semi-automatically or manually.

The electronic device 10 is configured to receive from the spinning machine 5 spinning parameters sp related to the production of yarn delivery bobbins 6. For this purpose, the spinning controller 50 transmits via the signal line 1s spinning parameters sp to the electronic device 10, for example, upon request by the electronic device 10, by accessing respective information of the control units 510, 520, 530 of the spinning units 511, 521, 531. For each produced yarn delivery bobbin 61, 62, 63, respective spinning parameters sp (which can include respective spinning positions 51, 52, 53) can be received and stored assigned to yarn delivery bobbin identifiers of the yarn delivery bobbins 61, 62, 63.

The electronic device 10 is configured to receive from the winding machine 7 winding parameters wp related to the production of yarn bobbins 8. For this purpose, the winding controller 70 transmits via the signal line 1s winding parameters wp to the electronic device 10, for example, upon request by the electronic device 10, by accessing respective information of the control units 710, 720 of the winding units 711, 721. For produced yarn bobbins 81, 82, respective winding parameters wp can be received and stored.

The electronic device 10 is configured to compare at least one of the winding parameters wp with a level which defines a normal state of the at least one winding parameter wp for detecting a winding abnormality. For example, comparison may occur repeatedly after lapse of predefined time intervals. For example, a number of clearing operations per unit of time, a number of winding errors per unit of time, etc. can be compared with a level which defines a normal number of clearing operations, winding errors, etc. per unit of time. For example, a winding abnormality is detected if a deviation from a normal level exceeds a threshold.

The electronic device 10 is configured, in case of a winding abnormality, to determine and compare at least one of the spinning parameters sp of yarn delivery bobbins received in the winding machines 7 with a level which defines a normal state of the at least one spinning parameters for locating the functional disorder lc within the spinning and winding section 1. For example, a number of clearing operations at the winding machine 7 below a predefined limit may indicate normal operation. For example, a number of clearing operations above a predefined limit may indicate a winding abnormality. In case of a winding abnormality, the electronic device 10 determines spinning parameters sp of yarn delivery bobbins 61, 62, 63 received in the winding machine 7 and compares spinning parameters with a level which defines a normal state of the spinning parameters. For example, an imperfection index is compared with a level which indicates a normal state. If the imperfection index has not a normal state, the functional disorder is determined at the spinning machine 5. If the imperfection index has a normal state, the functional disorder is determined at the winding machine 7. For example, winding parameters wp can include an identification of the winding position 71 with the abnormal number of clearings. For example, on the basis of yarn delivery bobbin identifiers, the yarn delivery bobbins 6 received in the winding position 71 can be determined. For example, based on the yarn delivery bobbin identifiers, an imperfection index of the yarn delivery bobbins 6 received in the winding position 71 can be determined. For example, if imperfection indices of yarn delivery bobbins 6 received in the winding position 71 have a normal state, the electronic device 10 can be configured to locate the winding position 71 as the location of the functional disorder within the spinning and winding section 1. Otherwise, if imperfection indices of yarn delivery bobbins 6 received in the winding position 71 have an abnormal state, for example, the electronic device 10 can be configured to determine from the spinning parameters sp the spinning position 52 which produced the yarn delivery bobbin 6, and to locate the spinning position 52 as the location of the functional disorder within the spinning and winding section 1.

Figure 2:
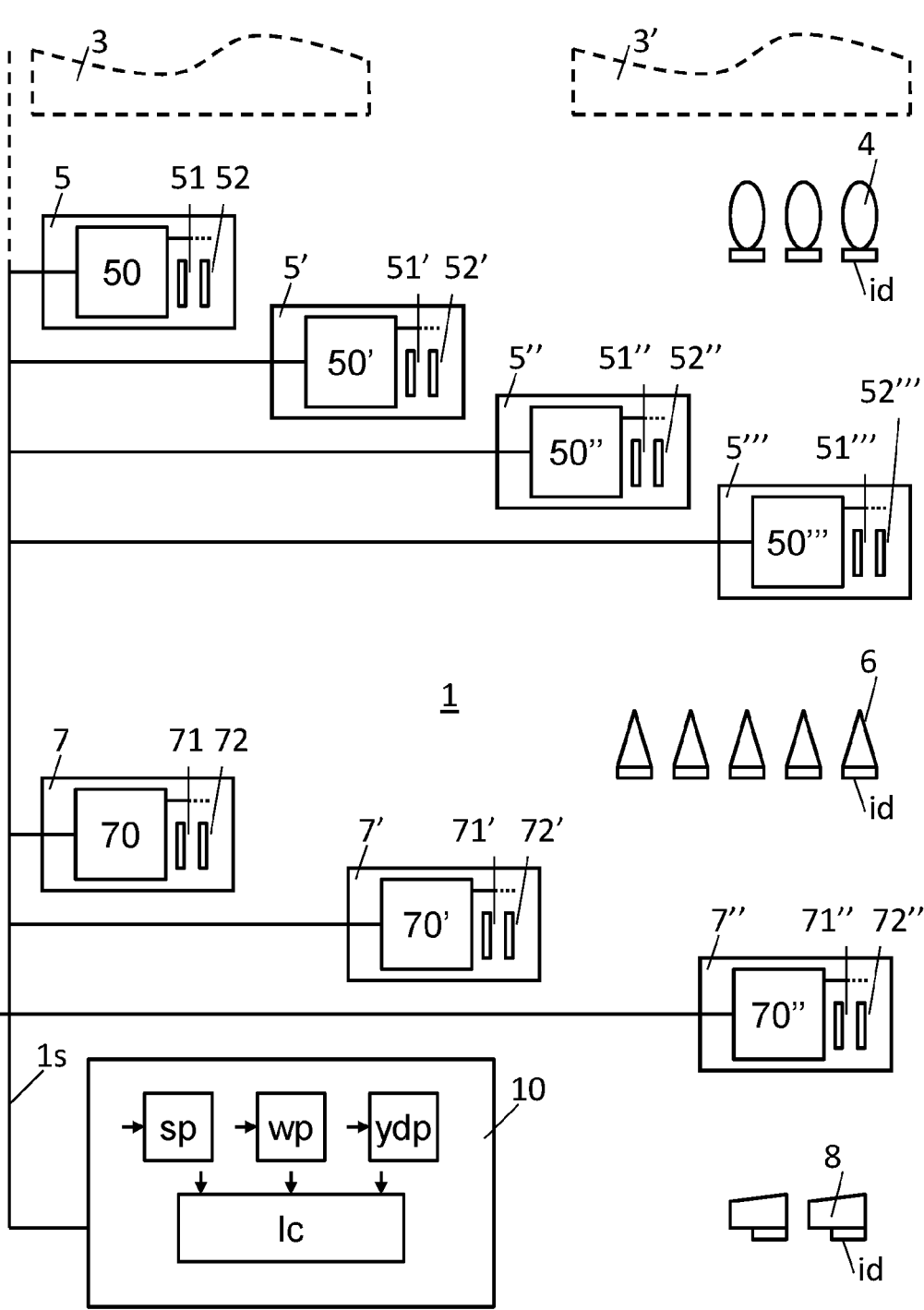
FIG. 2 illustrates schematically an electronic device locating a functional disorder within an exemplary spinning and winding section of a spinning mill having arranged a plurality of spinning machines and a plurality of winding machines.

FIG. 2 illustrates schematically an electronic device 10 for locating a functional disorder within an exemplary spinning and winding section 1 of a spinning mill having arranged a plurality of spinning machines 5, 5', 5", 5''', . . . and a plurality of winding machines 7, 7', 7", . . . . Upstream from the spinning machines 5, 5', 5", 5''', . . . , a plurality of roving machines 3, 3', . . . can be arranged for producing roving 4. Roving 4 is received at the spinning machines 5, 5', 5", 5''', . . . for producing yarn delivery bobbins 6 with wound yarn. Yarn delivery bobbins 6 with wound yarn are received at the winding machines 7, 7', 7", . . . for producing yarn bobbins 8.

As described above, the electronic device 10 is configured to receive from the one or more spinning machines 5, 5', 5", 5''', . . . spinning parameters sp related to the production of yarn delivery bobbins 6. Furthermore, for example, yarn delivery bobbin identifiers of the produced yarn delivery bobbins 6 can be received and stored together with respective spinning parameters sp.

For this purpose, for example, as illustrated in FIG. 2, each yarn delivery bobbin 6 can include an identifier unit id, such as an RFID tag (RFID: Radio Frequency Identifier), or a barcode, wherein the spinning machines 5, 5', 5", 5''', . . . can be configured to determine a yarn delivery bobbin identifier by reading a unique identification number from the identification unit id as described above.

The electronic device 10 can receive the yarn delivery bobbin identifier of a yarn delivery bobbin 6 by respectively controlling and accessing the spinning controller 50. The electronic device 10 can access further spinning parameters sp of the yarn delivery bobbin 6 and store the yarn delivery bobbin identifier of the yarn delivery bobbin 6 assigned to the further spinning parameters sp of the yarn delivery bobbin. During production of a yarn delivery bobbin 6, the electronic device 10 can store spinning parameters sp after lapse of a predefined time interval, after production of a predefined amount of yarn, etc. The time interval, amount of yarn, etc. may be variable. For example, during a first phase of the production of a yarn delivery bobbin 6, a different time interval, amount of yarn, etc. may be selected than during a second phase. For example, during an initial phase of the production of a yarn delivery bobbin 6, a smaller time interval may be selected than during an end phase of the production of a yarn delivery bobbin 6. For example, in accordance with the yarn wound on a yarn delivery bobbin 6, the electronic device 10 can have stored different imperfection indices, hairiness values, etc. for different sections of the yarn wound on the yarn delivery bobbin 6. Thus, for each produced yarn delivery bobbin 6, the electronic device 10 can have stored spinning parameters sp assigned to yarn and/or sections of yarn wound on the yarn delivery bobbin 6, together with the yarn delivery bobbin identifier of the yarn delivery bobbin 6. The spinning parameters sp can include an identification of the spinning machine 5, 5', 5", 5''', . . . , an identification of the spinning position 51, 52, 51', 52', . . . , etc.

Accordingly, when yarn delivery bobbins 6 are received in winding machines 7, 7', 7", . . . , for each winding position, the electronic device 10 can receive yarn delivery bobbin identifiers for determining spinning parameters sp of yarn delivery bobbins 6. Furthermore, the electronic device can receive from the winding machines 7, 7', 7", . . . winding parameters wp related to the production of yarn bobbins 8. The winding parameters wp can relate to the winding positions of the winding machines 7, 7', 7", . . . .

For this purpose, for example, the electronic device 10 can access the winding controllers 70 of the winding machine 7, 7', 7", . . . for receiving respective information from the control units 710, 720 of the winding positions 711, 721 of the winding machines 7, 7', 7", 7''', . . . .

13

The electronic device 10 is configured to compare at least one of the winding parameters wp with a level which defines a normal state of the at least one of the winding parameters wp, as described above, for detecting a winding abnormality.

The electronic device 10 is configured, in case of a winding abnormality, to determine and compare spinning parameters of yarn delivery bobbins 6 received in the winding machines 7, 7', 7'', . . . with a level which defines a normal state of the spinning parameters for locating the functional disorder lc within the spinning and winding section 1, as described above.

For example, for a particular winding position, a winding abnormality may result and the spinning parameters may have an abnormal state. I electronic device 10 can locate, on the basis of yarn delivery bobbin identifiers and spinning parameters sp, which include spinning positions, the functional disorder at respective spinning positions.

For example, for a particular winding position, a winding abnormality may result and the spinning parameters may have a normal state. I The electronic device 10 can locate the functional disorder at that winding position.

For example, when the electronic device 10 has located the functional disorder at a particular spinning position, the electronic device 10 can determine further spinning positions producing yarn delivery bobbins 6 with similar spinning parameters sp such as an imperfection index, hairiness, etc. and locate these spinning positions as possible functional disorders even when the winding parameters wp do not yet indicate an abnormality for yarn delivery bobbins 6 produced at these spinning positions.

For example, the winding parameters wp can include parameters such as an imperfection index, a hairiness, etc. determined at the winding machines 7, 7', 7'', . . . . Locating a functional disorder can be based on matching respective spinning parameters sp and winding parameters wp such as an imperfection index, hairiness, etc. Thus, if yarn delivery bobbins 6 having a parameter of a particular level, such as a particular imperfection index, hairiness, etc., result in an abnormal state, the spinning parameters sp can be used to identify all spinning positions producing yarn delivery bobbins 6 with a parameter of that particular level, thereby locating functional disorders. For example, a machine parameter may have been wrongly adjusted for a set of spinning positions.

For example, the winding parameters wp can include parameters such as an imperfection index, a hairiness, etc. determined at the winding machines 7, 7', 7'', . . . . Based on the yarn delivery bobbin identifier, the electronic device 10 can determine for each yarn delivery bobbin 6 a difference between respective spinning parameters sp and winding parameters wp. If the difference is larger than a predefined threshold, transportation of yarn delivery bobbins 6 from the spinning machines 5, 5', 5'', 5''', . . . to the winding machines 7, 7', 7'', . . . can be located as functional disorder. For example, during transportation, the yarn delivery bobbins 6 may have been exposed to air having a high air humidity level.

The electronic device 10 may include neural network algorithms, fuzzy logic algorithms, etc. for locating the functional disorder within the spinning and winding section 1 based on respective received spinning parameters sp and winding parameters wp.

Figure 3:
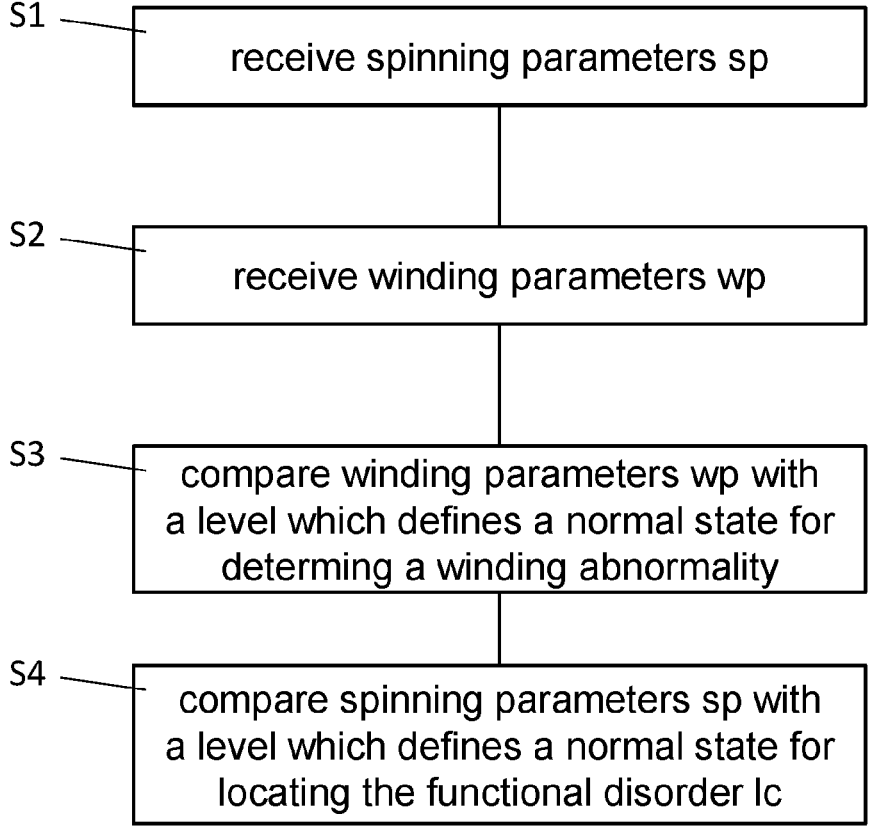
FIG. 3 illustrates schematically possible method steps of a method for locating a functional disorder within a spinning and winding section of a spinning mill.

FIG. 3 illustrates schematically possible method steps of a method for locating a functional disorder within a spinning and winding section 1 of a spinning mill. The spinning and winding section 1 includes one or more spinning machines 5, 5', 5'', 5''', . . . and one or more winding machines 7, 7', 7'', . . . . The one or more spinning machines 5, 5', 5'', 5''', . . . are configured to produce a plurality of yarn delivery bobbins 6 with wound yarn. The one or more winding machines 7, 7', 7'', . . . are configured to receive yarn delivery bobbins 6 with wound yarn produced by the one or more spinning machines 5, 5', 5'', 5''', . . . for producing yarn bobbins 8. The method includes executing at an electronic device 10 or a computer system the steps of receiving at step S1 from the one or more spinning machines 5, 5', 5'', 5''', . . . spinning parameters sp of produced yarn delivery bobbins 6; receiving at step S2 from the one or more winding machines 7, 7', 7'', . . . winding parameters related to the production of yarn bobbins 8; comparing at step S3 at least one of the winding parameters wp with a level which defines a normal state of the at least one of the winding parameters wp for determining a winding abnormality; at step S4, in case of a winding abnormality, determining and comparing at least one of the spinning parameters sp with a level which defines a normal state of the at least one spinning parameters sp for locating the functional disorder lc within the spinning and winding section 1.

The yarn delivery bobbins 6, 61, . . . can relate to spun yarn, which in particular is wound on any type of a carrier. The yarn bobbins 8, 81, . . . can relate to rewound yarn, which in particular relates to spun yarn which is rewound on any type of a carrier.

REFERENCE NUMERALS/SIGNS

1 spinning and winding section of a spinning mill
10 electronic device
1s, 5s, 7s signal lines
id identifier unit of roving, yarn delivery bobbins, yarn bobbins
3, 3' roving machines
4, 41, 42, 43 roving
5, 5', 5'', 5''' spinning machines
50 spinning controller
51, 52, 53 spinning positions
511, 521, 531 spinning units
510, 520, 530 control units of spinning units
6, 61, 62, 63, 65, 68 yarn delivery bobbins with wound yarn
7, 7', 7'', 7''' winding machines
70 winding controller
71, 72, 73 winding positions
711, 721, 731 winding units
710, 720, 730 control units of winding units
8, 81, 82 yarn bobbins
sp spinning parameters
wp winding parameters
lc location of the functional disorder

The invention claimed is:

1. An electronic device for locating a functional disorder within a spinning and winding section of a spinning mill, the spinning and winding section including one or more spinning machines configured to produce a plurality of yarn delivery bobbins with wound yarn and one or more winding machines configured to receive the yarn delivery bobbins to produce a plurality of yarn bobbins, the electronic device configured to perform the following:

from each spinning machine, receive spinning parameters related to production of the yarn delivery bobbins at the respective spinning machine;

from each winding machine, receive winding parameters related to production of the yarn bobbins at the respective winding machine;

for the yarn bobbins produced at the respective winding machines, compare at least one of the winding parameters with a normal state level of the winding parameter to detect a winding abnormality at the respective winding machine;

upon detection of the winding abnormality at the respective winding machine, identify the yarn delivery bobbins used for production of the yarn bobbin at the respective winding machine;

the electronic device configured to locate the functional disorder by comparing at least one of the spinning parameters of the identified yarn delivery bobbins with a normal state level of the spinning parameter:

wherein the electronic device determines that the functional disorder is at the spinning machine that produced the identified yarn delivery bobbins when the compared spinning parameter exceeds the normal state level; and wherein the electronic device determines that the functional disorder is at the transportation of the yarn delivery bobbins when the compared spinning parameter does not exceed the normal state level and no other abnormality is detected at the respective winding machine.

2. The electronic device of claim 1, wherein the electronic device is configured to determine the spinning parameters of the identified yarn delivery bobbins from yarn delivery bobbin identifiers provided on the yarn delivery bobbins.

3. The electronic device of claim 1, wherein the spinning parameters relate to one or more of: an imperfection index, a hairiness, a variation coefficient of yarn mass, a variation index of yarn diameter, a number of thick places per unit of length, a number of thin places per unit of length, a number of periodic yarn faults per unit of length, a number of yarn count variants per unit of length, and a number of foreign materials per unit of length.

4. The electronic device of claim 1, wherein the spinning parameters relate to one or more of: a doffing time, a spindle speed, a ring traveler speed, a number of yarn breaks per unit of time, an air temperature, and an air humidity.

5. The electronic device of claim 1, wherein the winding parameters relate to one or more of: a yarn tension, a number of clearing operations, a consumption of energy, a number of produced yarn bobbins per unit of time, an imperfection index, and a hairiness.

6. The electronic device of claim 1, wherein the electronic device is in communication with a controller for the spinning machines to receive the spinning parameters and with a controller for the winding machines to receive the winding parameters.

7. The electronic device of claim 6, further comprising a signal line interface located to receive the spinning parameters and the winding parameters via a signal line from the controller for the spinning machines and the controller for the winding machines.

8. The electronic device of claim 1, wherein the electronic device is configured to locate the functional disorder based on one or both of a neural network algorithm and a fuzzy logic algorithm.

9. The electronic device of claim 1, wherein the electronic device is configured to signal the location of the functional disorder to one or more of: the spinning machines, the winding machines, an automatic repair system, and a computer display.

10. A method for locating a functional disorder within a spinning and winding section of a spinning mill, the spinning and winding section including one or more spinning machines configured to produce a plurality of yarn delivery bobbins with wound yarn and one or more winding machines configured to receive the yarn delivery bobbins to produce a plurality of yarn bobbins, the method comprising using an electronic device to perform the following:

from each spinning machine, receive spinning parameters related to production of the yarn delivery bobbins at the respective spinning machine;

from each winding machine, receive winding parameters related to production of the yarn bobbins at the respective winding machine;

for the yarn bobbins produced at the respective winding machines, compare at least one of the winding parameters with a normal state level of the winding parameter to detect a winding abnormality at the respective winding machine;

upon detection of the winding abnormality at the respective winding machine, identify the yarn delivery bobbins used for production of the yarn bobbin at the respective winding machine;

locate the functional disorder by comparing at least one of the spinning parameters of the identified yarn delivery bobbins with a normal state level of the spinning parameter:

determine that the functional disorder is at the spinning machine that produced the identified yarn delivery bobbins when the compared spinning parameter exceeds the normal state level; and determine that the functional disorder is at the transportation of the yarn delivery bobbins when the compared spinning parameter does not exceed the normal state level and no other abnormality is detected at the respective winding machine.

11. The method of claim 10, wherein the electronic device locates the functional disorder based on one or both of a neural network algorithm and a fuzzy logic algorithm.

12. The method of claim 10, wherein the electronic device signals the location of the functional disorder to one or more of: the spinning machines, the winding machines, an automatic repair system, and a computer display.

* * * * *